United States Patent [19]
Kelly

[11] Patent Number: 6,064,724
[45] Date of Patent: May 16, 2000

[54] MODEM WITH AUTOMATIC CALLBACK PROVISIONS

[75] Inventor: Michael Gene Kelly, Fishers, Ind.

[73] Assignee: Thomson Consumer Electronics, Indianapolis, Ind.

[21] Appl. No.: 08/754,845

[22] Filed: Nov. 22, 1996

Related U.S. Application Data

[63] Continuation of application No. 08/367,504, Dec. 30, 1994, abandoned.

[51] Int. Cl.[7] .................................................. H04M 11/00
[52] U.S. Cl. ..................................... 379/92.04; 379/92.01; 379/106.01
[58] Field of Search .............................. 379/92.01, 92.03, 379/92.04, 106.03, 106.08, 106.01; 455/2; 348/1

[56] References Cited

U.S. PATENT DOCUMENTS

| | | | |
|---|---|---|---|
| 4,361,851 | 11/1982 | Asip et al. ................................. | 358/84 |
| 4,833,618 | 5/1989 | Verma et al. ............................. | 379/107 |
| 5,081,680 | 1/1992 | Bennett ..................................... | 379/92 |
| 5,157,716 | 10/1992 | Naddor et al. ........................... | 379/106 |
| 5,239,575 | 8/1993 | White et al. .............................. | 379/107 |
| 5,270,809 | 12/1993 | Gammie et al. .......................... | 358/84 |
| 5,300,980 | 4/1994 | Maekawa et al. ....................... | 379/106 |
| 5,374,951 | 12/1994 | Welsh ....................................... | 379/92 |

FOREIGN PATENT DOCUMENTS

| | | | |
|---|---|---|---|
| 0317082 | 5/1989 | European Pat. Off. ......... | H04H 9/00 |
| WOA8910670 | 11/1989 | WIPO .............................. | H04N 7/14 |

OTHER PUBLICATIONS

RCA DSS (I) Receiver, partial schematic, Modem circuitry, 1994.

Data Sheet, Silicon Systems, Single–Chip Modem with UART SSI 73K222U, Dec. 1993.

*Primary Examiner*—Stella Woo
*Attorney, Agent, or Firm*—Joseph S. Tripoli; Peter M. Emanuel; Robert D. Shedd

[57] ABSTRACT

A modem is included in a television receiver for transferring data, such as "pay per view" billing information, to a modem in a billing station during periodic callback operations. The television receiver modem monitors the telephone line for predetermined conditions, such as the presence of high frequency energy or a drop in the telephone line loop current, indicative of telephone use. The television receiver modem will ordinarily inhibit or terminate a callback in order to avoid interfering with normal telephone calls when the predetermined conditions are detected. However, the detection of the predetermined conditions may be caused by telephone network problems and not by normal telephone usage. Accordingly, the modem is controlled to ignore the detection of the conditions after a predetermined number of unsuccessful callbacks due to the detection of the conditions until a successful callback is achieved.

11 Claims, 4 Drawing Sheets

MODEM WITH AUTOMATIC CALLBACK PROVISIONS

This is a continuation of application Ser. No. 08/367,504 filed Dec. 30, 1994, now abandoned.

FIELD OF THE INVENTION

The invention concerns the field of modems and more particularly to modems which are required to automatically call back to a control station to communicate billing and other information.

BACKGROUND OF THE INVENTION

There are a variety of products which include or are associated with a modem connected to the telephone system for automatically communicating data, such as billing information, back to a control station. For example users of television receivers capable of receiving and processing television signals provided via a cable distribution network or a satellite in earth orbit are often required to pay fees. There is a basic connection fee for access to the service and a certain group of channels and a so called "pay for view" fee for access to special event programs, such as movies and sporting events. "Pay for view" fee billing information is accumulated and stored in the television receiver on a per use basis and is automatically transmitted ("downloaded") to a billing center via a modem. To this end, the modem initiates a "callback" to the billing center at regular, for example, monthly intervals. Usually the callbacks are paid for by the television signal provider.

A successful callback involves the initiation of a telephone call from the modem of the television receiver to a modem at the billing center, acknowledgment by the modem at the billing center (answering the telephone call and establishing a proper "handshaking" protocol) and a successful transfer of the billing information. Unfortunately, a callback may be unsuccessful for a variety of reasons. As a result, the television signal provider will not have an accurate basis for calculating the fee owed by the user. In addition, since old billing information for previously viewed programs will not have been transferred to the billing center from the television receiver, it will not be "cleared". Therefor, at some point, the user will be unable to select new programs for viewing. Accordingly, it is desirable to minimize billing problems due to unsuccessful modem callbacks.

One technique for avoiding billing problems due to unsuccessful callbacks is to cause the modem, after an unsuccessful callback, to initiate callbacks at relatively frequent intervals compared to the normal intervals until there is a successful callback. For example, the modem may be caused, after an unsuccessful callback, to callback at intervals between ten minutes and two hours until there is a successful callback. As a modification of this technique, the modem may be caused to callback at intervals which alternate between a very short interval, such as ten minutes, and a somewhat longer interval, such as an hour. However, the technique of utilizing more frequent callbacks may not result in a successful callback, and under some circumstances may cause the television signal provider (who is paying for the call backs) to incur unnecessary and unreasonably high expenses due to the numerous frequent callback attempts.

SUMMARY OF THE INVENTION

The present invention is in part based on a recognition that there may be various telephone network conditions which may cause a callback to be incorrectly aborted by the modem. For example, one condition may be the presence of high frequency energy due to noise on the telephone line which may be incorrectly interpreted by the modem to indicate someone speaking. Another condition is a drop in the loop current of the telephone line which may be incorrectly interpreted by the modem to be caused by someone having picked up a telephone hand unit.

The present invention is also based in part on the recognition that if a callback has to aborted by the modem a predetermined number of times, statistically it will be caused by one of the conditions described above, or the like, and not by the occurrence of an actual telephone call. Therefore, according to an aspect of the invention, the modem ignores an indication of a telephone call due to, for example, the presence of high frequency energy or a drop in loop current, and initiates or continues a callback despite the indication after a predetermined number of unsuccessful callbacks.

These and other features of the invention will be described with reference to the accompany Drawing.

DESCRIPTION OF THE PREFERRED EMBODIMENT

Figure 1:
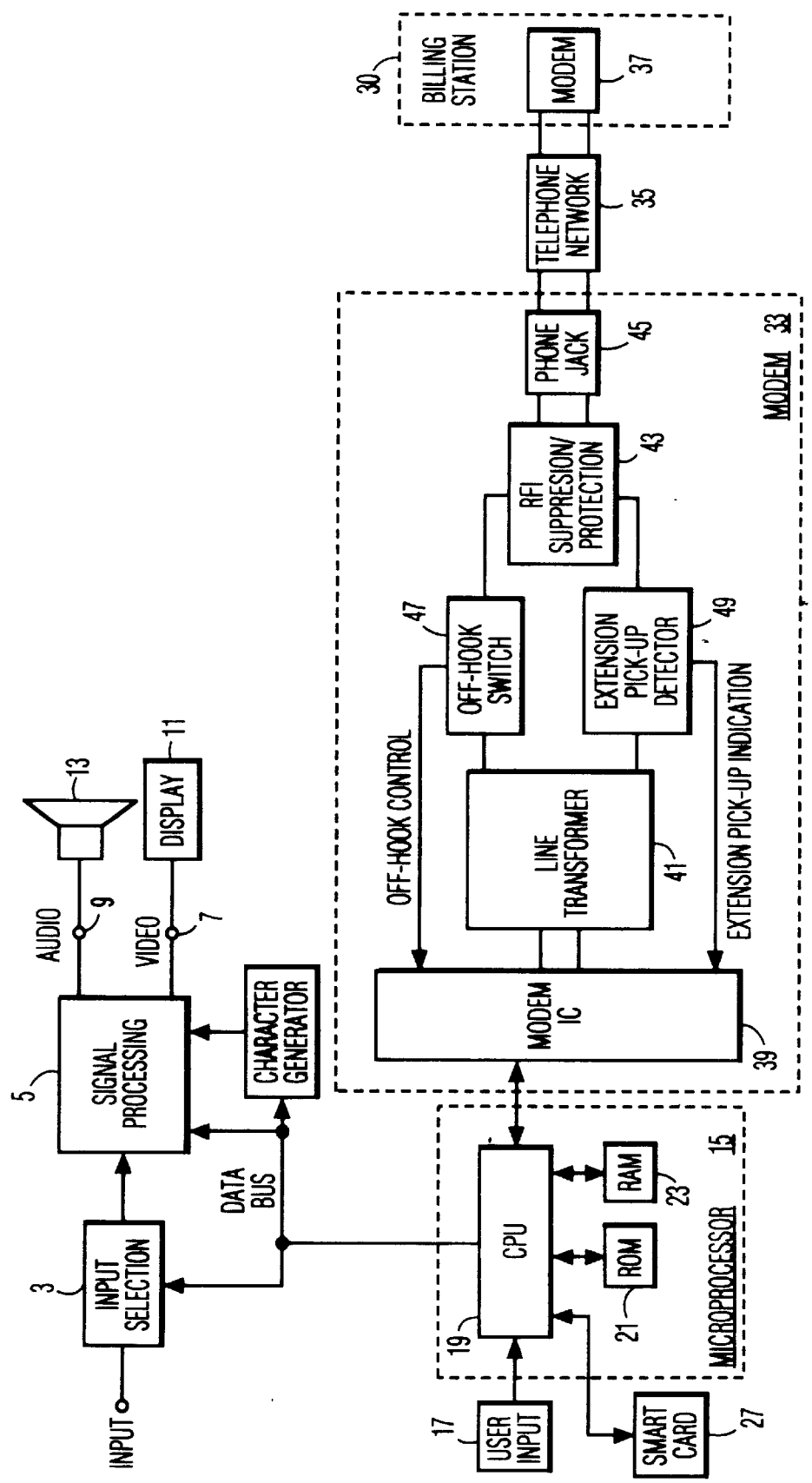
FIG. 1 is a block diagram of television receiver employing a modem which may utilize the invention.

The television receiver shown in FIG. 1 includes an input 1 for receiving a plurality of television signals, for example, from a satellite in earth orbit or a cable distribution network, an input selection unit 3 for selecting one of the plurality of received television signals and deriving video and audio signals from the selected television signal, a signal processing section 5 for processing the video and audio signals, and video and audio outputs 7 and 9 at which the processed video and audio signals are provided. The processed video and audio signals provided at respective ones of outputs 7 and 9 are coupled to respective ones of a display unit 11 and a sound reproducing unit 13. The television receiver shown in FIG. 1 may be a "television set" in which display unit 11 and sound reproducing unit 13 are integrally included within the "set". Alternatively display unit 11 and sound reproducing unit 13 may be included in an associated external "television set". In the latter case, the video and audio signals may be coupled to the external "television set" directly in the form of baseband signals or may be modulated on to an RF carrier which is coupled to the RF input of the external television set.

The various functions of input selection unit 3 and signal processing unit 5 and, in general, various "features" of the television receiver, are controlled by a microprocessor or microcomputer 15 in response to control signals received from a user control unit 17. User control unit 17 may include a remote control transmitter and a remote control receiver (not shown). Microprocessor 15 includes a central processing unit (CPU) 19, read only memory (ROM) 21 and random access memory (RAM) 23. ROM 21 stores the control program and other data for controlling the television receiver. Data stored in ROM 21 is coupled to CPU where it is processed. RAM 23 temporarily stores data processed by CPU 19. While ROM 21 and RAM 23 are indicated as being integrally included within the same integrated circuit as CPU 21 by a surrounding dashed line, either one or both for ROM 21 and RAM 23 may be separated units. Microprocessor 15 communicates with various portion of the television receiver via a data bus.

The television receiver has a very large number of relatively complex control functions and features which are controllable by a user. To facilitate the use of these functions and features, the television receiver includes a character generator 25 for generating character representative signals for causing display unit 11 to display text instructions, status and other information to guide the user. The character signals are coupled to signal processing section 5 where they are inserted into the video signal which is coupled display unit 11. The character signals are generated in response to display data stored in ROM 21 of microprocessor 15.

A so-called "smart card" unit 27 receives a smart card containing its own microprocessor and associated ROM and RAM (not shown) for processing decryption and other access control information necessary for allowing a the television receiver to select and process the received television signals. The smart card is purchased by the user from the provider of the television signals, such as the cable network or satellite system operator.

Among the many functions and features controllable by the user is the selection of so called "pay for view" programs. The pay for view programs are selected by the user by means of keys of user control unit 17 in response to program choice information displayed on the screen of display 11. Each time a pay for view program is selected, corresponding billing information is stored in the smart card under the control of microprocessor 15. There are a limited number of memory "slots" available for pay for view programs.

Microprocessor 15 periodically attempts to transfer the billing information to a billing or control station 30 operated by the provider of the television signals via a modem 33 connected to the telephone network 35. It is necessary to periodically transfer the billing information to the billing station so that the television signal provider will have an up-to-date basis for calculating the pay for view fee owed by the user. It is also necessary to periodically transfer the billing information to the billing station to ensure that old billing information for previously viewed programs will be "cleared", thereby making "slots" available for the selection of new pay for view programs.

The transfer of billing information requires modem 33 of the television receiver to call a modem 37 at billing station 30, billing station modem 37 to acknowledge the receipt of the call from television receiver modem 33 by answering the telephone call and establishing a proper "handshaking" protocol and the successful transfer of billing information. This operation is called a "callback". A typical callback operation lasts between 30 and 60 seconds, and upon completion modem 33 will automatically "hang-up".

A callback may be unsuccessful due to a variety of telephone network problems. Before describing these problems and their solutions according to various aspects of the invention, a brief description of the structure of modem 33 will helpful.

Modem 33 includes an integrated circuit (IC) 39 which controls various functions of modem 33. Modem IC 39 may, for example, comprise a type 73K222U IC available from Silicon Systems Incorporated of Tustin, Calif. Modem IC 39 communicates with microprocessor 15 via the data bus and is connected to telephone network 35 via a line transformer 41, a RFI (radio frequency interference) suppression and protection unit 43 and a connector 45 commonly referred to as a "phone jack". An "off-hook" switching unit 47 and an "extension pick-up" detector 49 are interposed between line transformer 41 and RFI suppression and protection unit 43.

In operation, under the control of microprocessor 15, modem IC 39 will initiate a telephone call by causing switching unit 47 to put modem 33 in an "off-hook" condition corresponding to a user picking-up the hand-unit of a conventional telephone. Thereafter, modem IC 39 determines whether or not there is a dial tone present by checking for energy in the dial tone frequency band, for example, between 350 and 650 Hz. If a dial tone is present, a further determination is made to ensure that another telephone call previously placed via an extension telephone is not already in progress by checking for energy in the voice frequency band, for example, between 1650 and 1850 Hz. Most modems applications do not require the ability to distinguish dial tone from voice. However, due to the automatic callback operation for transferring billing information, the ability to distinguish voice from dial tone is needed to prevent the modem 33 from interrupting a user's telephone conversation with a series of tones or pulses representing the telephone number of billing station 30. Checking for energy in the dial tone frequency band (360–640 Hz) is not sufficient because voice signals may contain energy in the dial tone frequency band. The check for the presence of high frequency energy in the 1650–1850 Hz band virtually eliminates the possibility of incorrectly detecting voice signals as a dial tone. If a dial tone is present and the presence of high frequency energy is not detected, modem IC 39 causes the telephone number to be dialed.

If at any time during the callback operation, if the hand-unit of an extension telephone is picked-up to place a call, "extension pick-up" detector 49 detects the occurrence and modem IC 33 causes the callback to be terminated by causing switching unit 47 to place modem 33 in the "on-hook" condition, that is, "hang-up". Extension pick-up detector 49 operates by detecting a drop in loop current which occurs whenever the hand unit of a telephone is picked-up placing the telephone in an "off-hook" condition. This feature is desirable because the callback operation is performed automatically without any user interaction or control and it permits the user to interrupt the callback operation to place an emergency telephone call.

While the test performed by modem 33 described above are desirable for the reasons stated, they can result in unsuccessful callbacks when certain telephone network conditions occur. As a result, the billing information will not be updated and the user may not be able to select additional pay for view programs. The telephone network conditions which result in unsuccessful callbacks problems and solutions to these problems according to respective aspects of the invention will now be described.

One telephone network condition which may result in an unsuccessful callback is due to the generation of a poor quality dial tone which does not meet the FCC (Federal Communication Commission) requirements. A poor quality dial may have an amplitude exceeding the maximum specified amplitude, contain harmonics in relatively high frequency bands, or contain excessive noise components (i.e., have a poor signal to noise ratio). All three of these conditions cause modem IC 39 to detect the presence of high frequency energy thereby incorrectly indicating the presence of a voice signal instead of a dial tone. This causes each callback attempt to be aborted.

To overcome the problem caused by the high frequency energy test, under control of microprocessor 15, after a predetermined number, N, of consecutive callback attempts have been terminated due to the detection of high frequency energy, the detection of high frequency energy will be ignored and modem 33 will dial out during subsequent callback attempts until a successful callback has been completed. After the first callback failure, the interval between callbacks attempts is desirably shortened compared the normal interval (e.g., about once per month) so that a successful callback will be achieved within a relatively short time. For example the interval may be shortened to an interval between ten minutes and two hours. In addition, the two or more relatively short intervals may be interleaved. For example, a ten minute interval may be alternated with a one hour interval. Once a successful callback has been completed, the dial tone validation step employing the high frequency energy test to discriminate between a dial tone and a voice signal will again be utilized until another N consecutive callback failures have again occurred.

Figure 2:
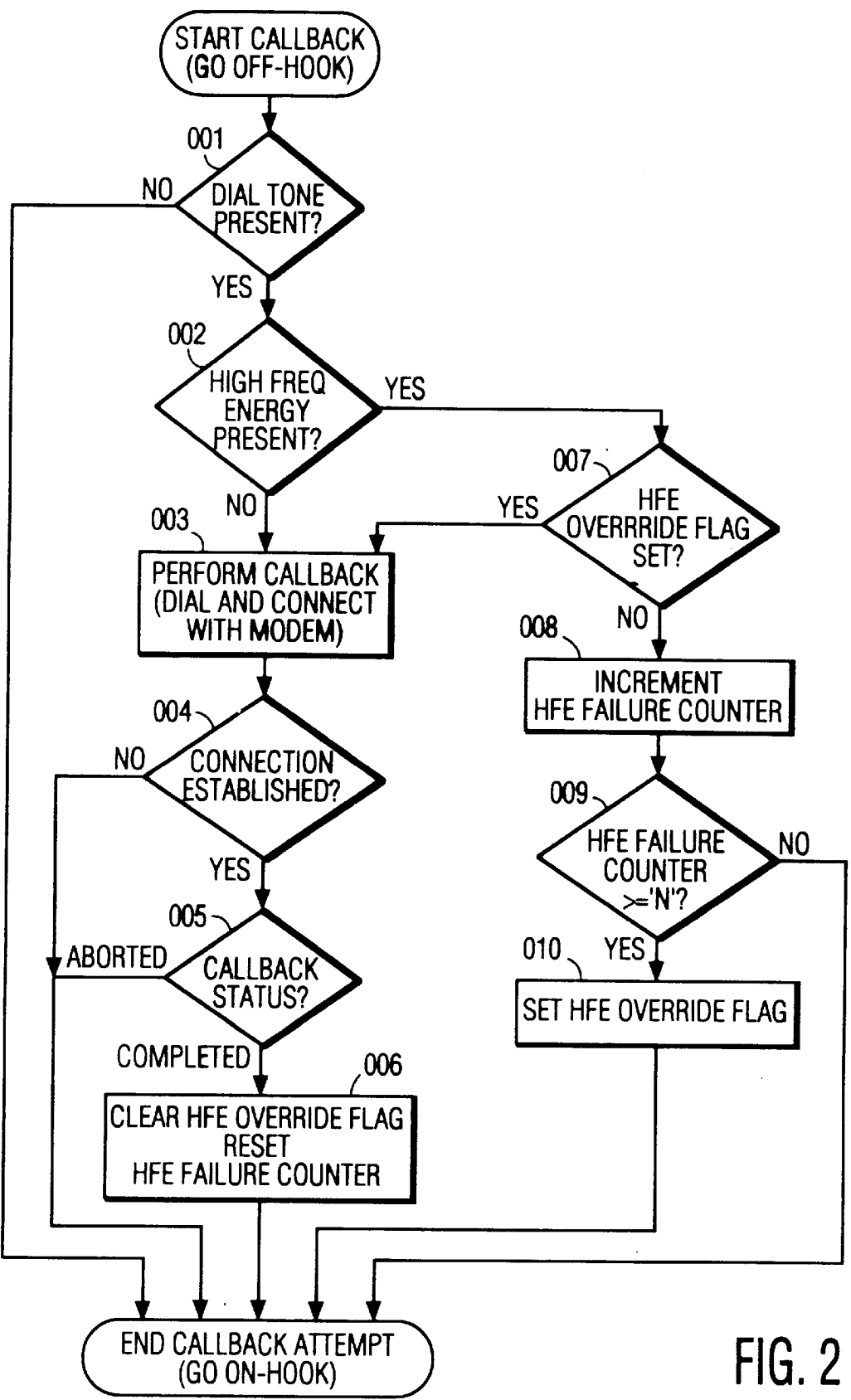
FIG. 2 is a flow chart of a callback control program for controlling the modem of the television receiver shown in FIG. 1 in accordance with an aspect of the invention.

The flow chart for the control program for overriding the results of the high frequency test during the dial tone validation step is shown in FIG. 2. Step 001, which determines whether or not there is energy in the dial tone frequency band, and step 002, which determines whether or not there is energy in a relatively high frequency band, are used to distinguish between a dial tone and a voice signal, as previously described. If there is a dial tone without high frequency energy, television receiver modem 33 is caused to dial the telephone number of billing station modem 37 in step 003. Thereafter, there is a determination in step 004 of whether or not a connection between television receiver modem 33 and billing station 37 has been achieved. A connection is verified if modem 37 answers modem 33 and establishes a handshaking protocol. If a connection with billing station modem 37 has been verified, a determination is made in step 005 of whether the transfer of billing information has been completed, signifying a successful callback, or whether an error has occurred during the transfer of information, in which case the callback is aborted. Modem IC 39 of television receiver modem 33 determines whether or not the transfer of information has been completed by determining whether or not a carrier is still being received (i.e., whether or not billing station modem 37 has "hung-up"). Alternatively, the completion of information transfer may be determined by the receipt of a information transfer acknowledgment transmitted by billing station modem 37.

A negative result in any one of the dial tone test (step 001), the connection test (step 004) or the callback status (or completion) test (step 005) will cause the callback to be terminated.

Once a callback has been successfully completed (step 005), a "HFE override" flag is cleared and a "HFE failure" counter is reset in step 006. Thereafter, the callback is terminated. The label HFE in the flow chart stands for "high frequency energy". The HFE override flag and the HFE failure counter are used to ignore the results of the high frequency energy test (step 002) and to initiate a callback if a predetermined number of callback attempts have failed, as will now be described.

If a dial tone is present (step 001) and high frequency energy is also present (step 002), the status of the HFE override flag is checked in step 007. If the HFE override flag has not been set, the count of the HFE failure counter is increased by one in step 008. The count of the HFE failure counter is checked in step 009. If it is less than the predetermined number N, the callback attempt is terminated. However if the count is equal to or greater than the predetermined number N, the HFE override flag is set in step 010, and thereafter, the callback is terminated. Setting the HFE override flag will cause the telephone number of billing station modem 37 to be dialed (steps 007 and 003) during the next callback attempt independent of the results of the high frequency energy test (step 002). After a successful callback, the results of high frequency energy test (step 002) will again be caused to be utilized because the HFE override flag is cleared and the HFE failure counter is reset in step 006.

It has been found that four is a suitable predetermined number of unsuccessful callback attempts before the high frequency energy test is ignored. However, other predetermined numbers may be used. In addition, the predetermined number may be changed in response to control information transmitted with the television signal or via telephone network 35. Further, the predetermined number may be adaptively change depending on the history of callback failures and successes.

The above described procedure allows callbacks to be complete when telephone network 35 provides a dial tone which is not according to specifications. However, it may cause television receiver modem 33 to dial (using tone or pulse) during a user's telephone conversation. After television receiver modem 33 finishes dialing the number, it will wait for billing station modem 37 to answer and then will eventually hang-up when a predetermined time interval, for example, 60 seconds, has elapsed. However, television receiver modem 33 will not cause the user to be disconnected and will not emit any sounds during the waiting period.

Another telephone network condition which may result in an unsuccessful callback is due to a drop in loop current. For example, some telephone switching equipment cause drops in loop current, especially when DTMF (dual tone multi-frequency tone decoders are switched out after a telephone number has been dialed using touch-tones (DTMF).

As noted above, a drop in loop current is detected by extension pick-up detector 49 and is interpreted by modem IC 39 to mean that someone has picked up a telephone. Accordingly, during a callback, modem 33 is caused to hang up thereby interrupting the callback. This prevents the billing information from being updated. However, it may also cause the television signal provider (who typically pays for the callbacks) to incur unnecessary expenses due to the number of callbacks which are interrupted after the billing modem has answered the call. In the latter regard, as was noted above, modem callback systems may automatically increase the callback frequency once a callback has failed in order to attempt to produce a successful callback.

To overcome the problem caused by the drop in loop current test, under control of microprocessor 15, after a predetermined number, N, of consecutive callback attempts have been terminated due to the detection of a drop in loop current, the detection of a drop in loop current will be ignored and modem 33 will continue the callback until a successful callback has been completed. After the first callback failure, the interval between callbacks attempts is desirably shortened compared the normal interval (e.g., about once per month) so that a successful callback will be achieved within a relatively short time. For example the interval may be shortened to an interval between ten minutes and two hours. In addition, the two or more relatively short intervals may be interleaved. For example, a ten minute interval may be alternated with a one hour interval. Once a successful callback has been completed, the drop in loop current test will again be utilized until another N consecutive callback failures have again occurred.

Figure 3:
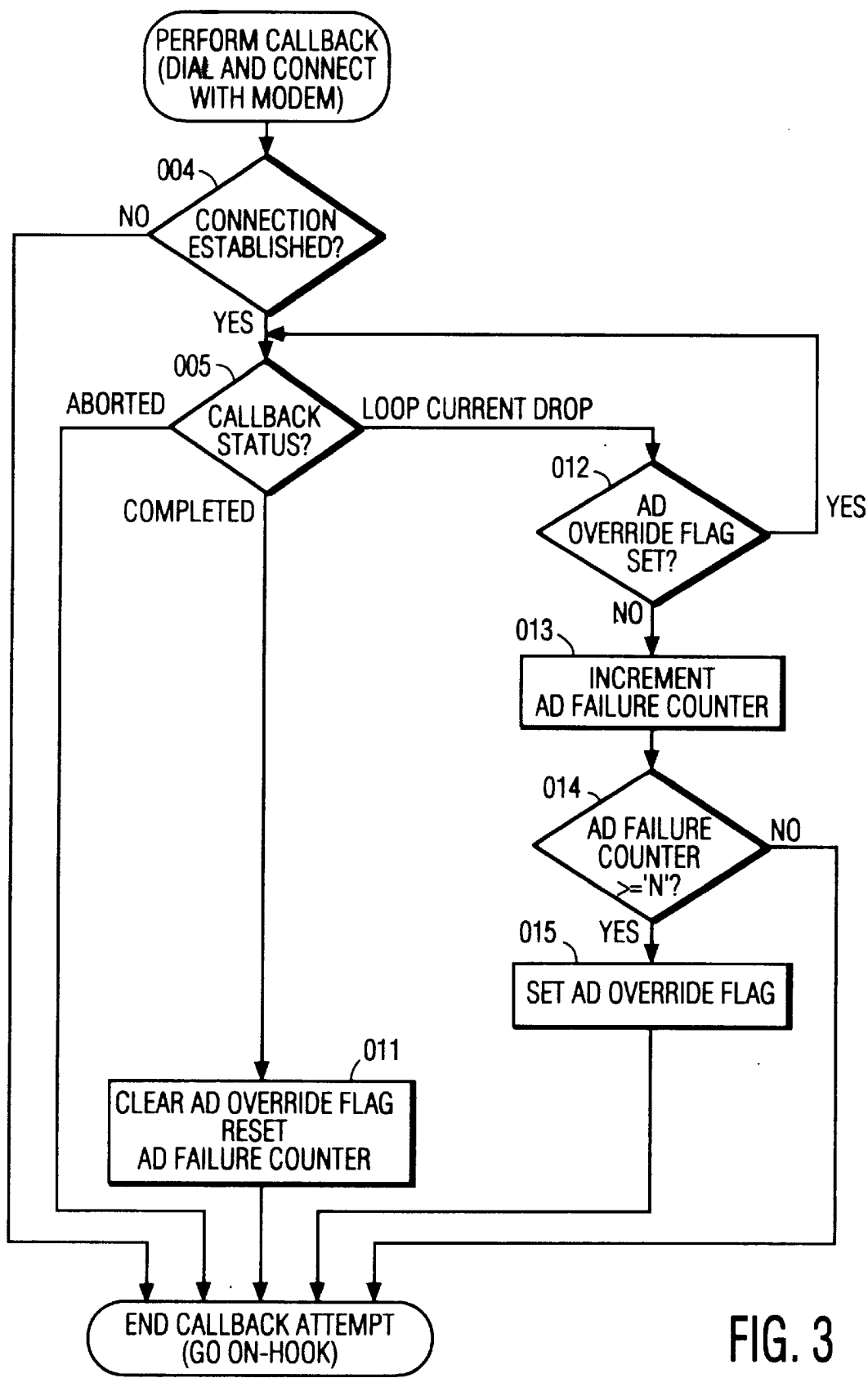
FIG. 3 is a flow chart of another callback control program for controlling the modem of the television receiver shown in FIG. 1 in accordance with another aspect of the invention.

The flow chart for the control program for overriding the results of the drop in loop current test is shown in FIG. 3. In the flow chart shown in FIG. 3, steps which correspond to steps of the flow chart shown in FIG. 2 are identified by the same reference numbers. Therefor, portions of the flow chart shown in FIG. 3 which are similar to portions of the flow chart shown in FIG. 2 will not be described in detail again.

Since the drop in loop current test is intended to allow a user to interrupt a callback under normal conditions, it is associated with the callback status test (step 005). Assuming that there is no drop in the loop current, and that a callback has been successfully completed, an "AD override" flag is cleared and an "AD failure" counter is reset in step 011. Thereafter, the callback is terminated. The label AD in the flow chart stands for "automatic disconnect". The AD override flag and the AD failure counter are used to ignore the results of the drop in loop current test (step 005) if a predetermined number of unsuccessful callbacks have failed, as will now be described.

If the loop current has dropped, the status of the AD override flag is checked in step 012. If the AD override flag has not been set, the count of the AD failure counter is increased by one in step 013. The count of the AD failure counter is checked in step 014. If it is less than the predetermined number N, the callback attempt is terminated. However if the count is equal to or greater than the predetermined number N, the AD override flag is set in step 015, and thereafter, the callback is terminated. Setting the AD override flag will cause the results of the drop in loop current test (step 005) to be ignored (note the "YES" path back to step 005 from step 012) during the next callback attempt. After a successful callback, the results of drop in loop current test (005) will again be caused to be utilized because the AD override flag is cleared and the AD failure counter is reset in step 011.

As with the high frequency energy test, it has been found that four is a suitable predetermined number of unsuccessful callbacks. However, other predetermined numbers may be used, the predetermined number may be change in response to control information transmitted with the television signal or via telephone network 35, and the predetermined number may be adaptively changed.

The above described procedure allows callbacks to be completed when the loop current has dropped. However, during the time a drop in loop current condition is being ignored, the user cannot cause television receiver modem 33 to release the telephone line (hang-up) by simply picking up a telephone hand-set (going off-hook). However, a typical callback only lasts between 30 and 60 seconds, and modem 33 will hang up upon completion of the callback. At any rate, after a successful callback the drop in loop current/automatic disconnect feature will again be enabled. Therefor, no real difficulties are anticipated.

Figure 4:
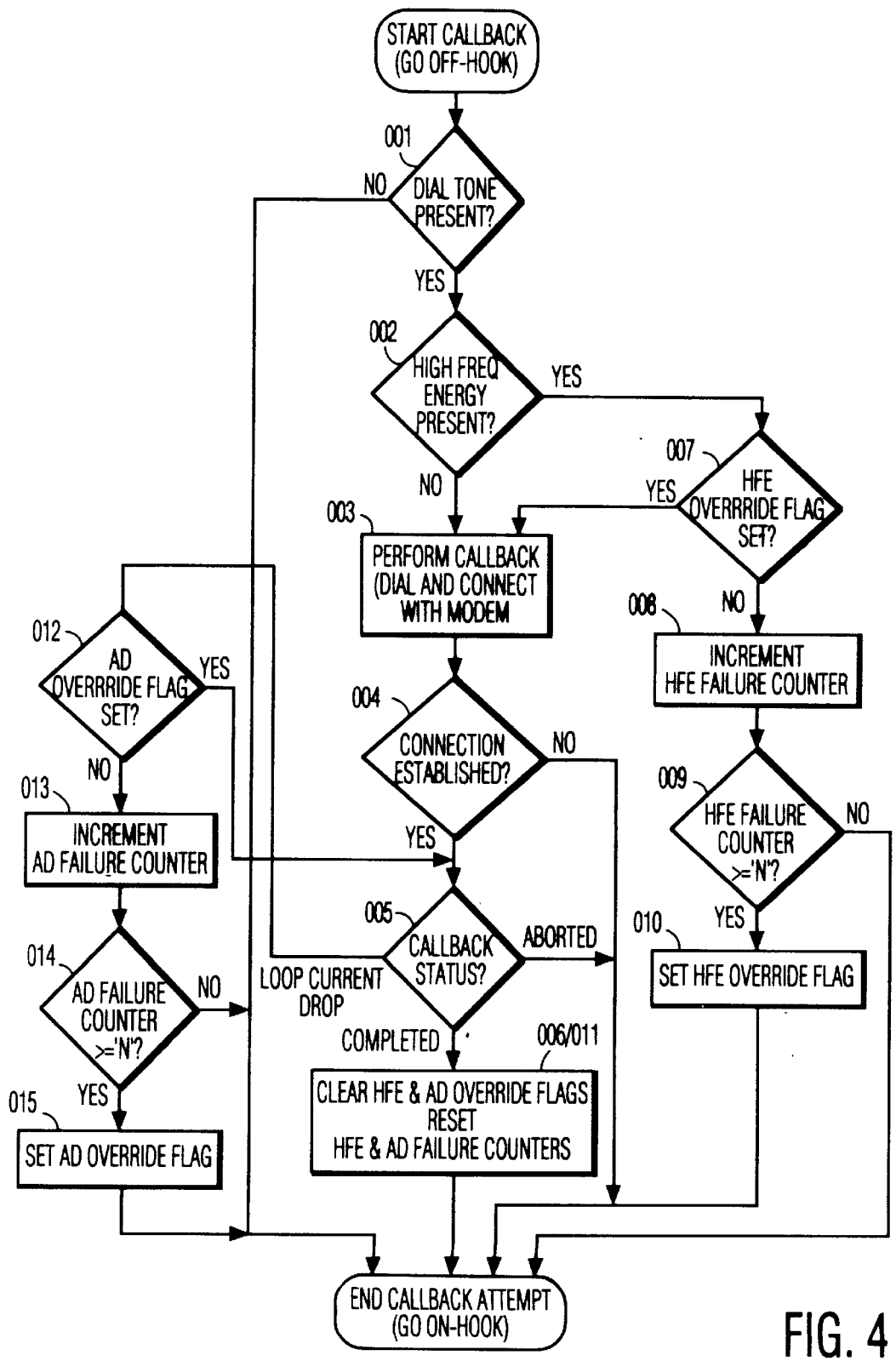
FIG. 4 is a flow chart of still another callback control program for controlling the modem of the television receiver shown in FIG. 1 in accordance with still another aspect of the invention.

While the modem callback control programs indicated by the flow charts shown in FIGS. 2 and 3 may be utilized individually (i.e., one without the other), it is desirable that both be used together because the conditions to which they are directed are both frequently encountered. The manner in which the two control programs may be combined is indicated by the flow chart shown in FIG. 4. In the flow chart shown in FIG. 4, steps which correspond to steps of the flow charts shown in FIGS. 2 and 3 are identified by the same reference numbers and therefor will not be described in again.

Modifications in addition to those described above are possible. For example, it will be appreciated that the principal of initiating or continuing a callback after a predetermined number of callbacks have failed can be utilized to deal with telephone network conditions other than those which have been specifically described. Further, while the same predetermined number of unsuccessful callbacks are used for the two conditions to which the embodiments described above are directed, different predetermined numbers of unsuccessful callbacks may be used for the two (and other) conditions. Still further, while the present invention has been described in terms of a modem included as an integral part of the equipment which it serves, the modem may be a separate external unit. In addition, while the invention has been described with reference to a modem used to communicate billing information for a television receiver, it will be appreciated that it is also applicable to modems used in other applications in which automatic callbacks are required. These and other modification are intended to be within the scope of the invention defined by the following claims.

I claim:

1. Apparatus comprising:
   a first modem;
   means for connecting said first modem to signal lines of a telephone network;
   means for detecting at least one signal condition existing on said signal lines of said telephone network to indicate when said signal lines connected to said first modem are in use; and
   means for controlling said first modem;
   said controlling means causing said first modem to attempt to establish communications with and to transfer data to a second modem connected to said telephone network during callback operations which occur at first intervals, but causing said first modem to terminate a callback operation in response to a detection of said signal condition which indicates that said signal lines connected to said first modem are in use; and
   said controlling means causing a detection of said signal condition which indicates that said signal lines connected to said first modem are in use to be ignored thereby not causing said first modem to terminate a callback operation after a predetermined number of callback operations have previously been terminated in response to detections of said signal condition which have indicated that said signal lines connected to said first mentioned modem were in use.

2. The apparatus recited in claim 1, wherein:
   said controlling means causes said first modem to attempt to establish communications with and to transfer data to said second modem during callback operations which occur at second intervals which are shorter than said first intervals after said predetermined number of callback operations have been terminated in response to detections of said signal condition which have indicated that said signal lines connected to said first mentioned modem were in use.

3. The apparatus recited in claim 1, further including:

means for detecting the successful completion of a callback operation; and wherein said controlling means is responsive to a detection that a callback operation has been successfully completed after said predetermined number of callback operations have been terminated in response to detections of said signal condition which have indicated that said signal lines connected to said first mentioned modem were in use for causing a detection of said signal condition which indicates that said signal lines connected to said first mentioned modem are in use to be no longer ignored until after said predetermined number of callback operations have again been terminated.

4. The apparatus recited in claim 3, wherein:

said means for detecting at least one signal condition existing on said signal lines detects the presence of energy in a frequency band which is higher than the frequency band of dial tone signals generated by said telephone network.

5. The apparatus recited in claim 3, wherein:

said means for detecting at least one signal condition existing on said signal lines detects a drop in the loop current provided by said telephone network.

6. Apparatus comprising:

a first modem;

means for connecting said first modem to signal lines of a telephone network;

means for detecting the presence of energy in a frequency band which is higher than the frequency band of dial tone signals provided by said telephone network to said signal lines connected to said first modem;

means for detecting a drop in a loop current provided by said telephone network to said first modem via said signal lines connected to said first modem;

means for controlling said first modem;

said controlling means causing said first modem to periodically attempt to establish communications with and to transfer data to a second modem connected to said telephone network during callback operations which occur at intervals, causing said first modem to terminate a callback operation by not allowing said modem to attempt to establish communications with said second modem in response to a detection of the presence of said high frequency energy on said signal lines connected to said first modem, and causing said first modem to terminate a callback operation by terminating communications already established with said second modem in response to a detection of a drop in the loop current provided by said telephone network to said first modem via said signal lines connected to said first modem;

said controlling means causing a detection of the presence of said high frequency energy to be ignored after a first predetermined number of callback operations have previously been terminated in response to detections of the presence of said high frequency energy on said signal lines connected to said first modem; and said controlling means causing a detection of the drop in the loop current provided by said telephone network to said first modem via said signal lines connected to said first modem to be ignored after a second predetermined number of callback operations have previously been terminated in response to detections of the drop in the loop current provided by said telephone network to said first modem via said signal lines connected to said first modem.

7. The apparatus recited in claim 6, wherein:

said first and second predetermined numbers are equal.

8. The apparatus recited in claim 6, wherein:

said first and second predetermined numbers are different.

9. A method for controlling a first modem, comprising the steps of:

detecting at least one signal condition existing on signal lines of a telephone network connected to said first modem to indicate when said signal lines connected to said first modem are in use;

causing said first modem to periodically attempt to establish communications with and to transfer data to a second modem via said telephone network during callback operations which occur at intervals, but causing said first modem to terminate a callback operation in response to a detection of said signal condition which indicates that said signal lines connected to said first modem are in use; and causing a detection of said signal condition which indicates that said signal lines connected to said first modem are in use to be ignored thereby not causing said modem to terminate a callback operation after a predetermined number of callback operations have previously been terminated in response to detections of said signal condition which have indicated that said signal lines connected to said first modem were in use.

10. The method recited in claim 9, further including the step of:

causing said modem to attempt to establish communications with and to transfer data to said second modem during callback operations which occur at intervals which are shorter than said first intervals after said predetermined number of callback operations have been terminated in response to detections of said signal condition which have indicated that said signal lines connected to said first modem are were use.

11. The method recited in claim 9, further including the steps of:

detecting the successful completion of a callback operation; and causing a detection of said signal condition which indicates that said signal lines connected to said first modem to be no longer ignored in response to a detection that a callback operation has been successfully completed after said predetermined number of callback operations have been terminated until after said predetermined number of callback operations have again been terminated.

* * * * *